Feb. 7, 1967    W. S. FRANKLIN    3,302,961
COMPRESSION CERAMIC-METAL SEAL
Filed April 14, 1961

INVENTOR.
W.S. FRANKLIN

BY

AGENT

United States Patent Office

3,302,961
Patented Feb. 7, 1967

3,302,961
COMPRESSION CERAMIC-METAL SEAL
William Sidney Franklin, Bethpage, N.Y., assignor to North American Philips Company, Inc., New York, N.Y., a corporation of Delaware
Filed Apr. 14, 1961, Ser. No. 103,160
10 Claims. (Cl. 287—189.365)

This invention relates to hermetic ceramic-metal seals, and in particular to such seals employing high compression to improve their properties.

Compression-type glass-metal seals have been known for some time, and their superior properties over ordinary glass-metal seals have also been recognized. In the manufacture of this seal, the glass is melted within a metal ring whose expansion coefficient exceeds that of the glass, and then the assembly is rapidly cooled. Due to the differences in the expansion coefficients and the rapid cooling, compressive stresses are established within the frozen glass which locks it tightly within the metal ring. The joint is so strong between the glass and metal that chemical bonding is unnecessary. There is no obvious analogue with a ceramic substituted for the glass, since the former has such a high melting point that it cannot be melted in practice without also destroying the metal shape.

The chief object of the invention is an improved ceramic-metal seal employing high compression affording greater strength and greater thermal shock resistance, while retaining vacuum tightness and the higher temperature capabilities and lower losses of the conventional ceramic-metal seal.

Briefly speaking, the seal of the invention is characterized by an annular metal member of relatively high expansion coefficient. Lying completely within the metal member is a ceramic member of lower expansion coefficient. The outer surface of the ceramic is metallized and between the surface and the metal is a layer of brazing material. In a preferred form of the invention, both the inner surface of the metal member and the outer surface of the ceramic member are tapered. During the assembly of the members, this tapering permits the spacing between the ceramic member and the metal member, which is filled with a brazing material, to be minimized, thus establishing compressional forces in the ceramic of large magnitude and adding tremendous strength to the seal structure.

The invention will now be described in greater detail with reference to the accompanying drawing in which.

Figure 1:
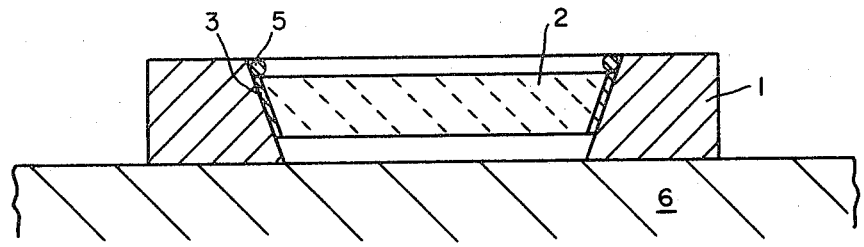
FIG. 1 is a cross-sectional view of a preferred form of the seal of the invention during assembly and prior to completion.

The crux of the inventive seal is to mismatch the ceramic and surrounding metal member. This is possible because most ceramics, and particularly alumina-type ceramics, possess compressive strengths of over one-quarter million pounds per square inch. To take advantage of this tremendous strength, suitable materials are chosen for the outer metal member so that it possesses a much greater expansion coefficient than that of the inner ceramic so that the residual stress after sealing will place the ceramic into a high compressive state. Suitable materials include nickel, iron, copper, Monel, cold-rolled steel, or alloys thereof, whose expansion coefficients average about $165 \times 10^{-7}$ cm./cm./° C. Common alumina-type ceramic compositions have an expansion coefficient averaging about $60 \times 10^{-7}$ cm./cm./° C. Other suitable ceramics include not only low and high alumina bodies, but also single-crystal sapphire, forsterite, steatite, and similar ceramic compositions. It is essential when choosing a metal and ceramic in accordance with the invention that their expansion coefficients differ by at least a factor of 1.5.

To enable the ceramic to be sealed or bonded to the brazing material, its surface must first be metallized. All presently known metallizing techniques may be employed for this purpose, including active-metal bonding, refractory-metal sealing or combinations of both, titanium-nickel or copper alloy bonding, zirconium-nickel, copper or silver alloys, gold or gold alloys, bonded titanium cored metals or alloys, and others. It is preferred to employ the so-called molybdenum-manganese metal process, which comprises applying to the surface of the ceramic member a finely divided mixture of molybdenum and manganese to sinter the metal powder to the ceramic surface. On the thus-produced metal surface is then applied a metal layer by conventional plating or evaporation techniques. An example of a suitable technique is as follows. To 60 ml. of acetone and a like amount of isoamyl acetate is added 240 grams of molybdenum powder and 60 grams of manganese powder both of fine particle size passing through a −325 mesh. This mixture is ball-milled until the particle size is reduced to about 1 micron, after which 25 ml. of an 8% nitrocellulose lacquer is added to the mixture, which is then further ball-milled for at least another 8 hours. A thin layer of the mixture is then applied by any conventional way, such as painting, rolling, silk screening, or dipping, to the outer surface or other bonding surface of the ceramic to a coating thickness of the order of 1 mil, although this is not critical. The ceramic member is then placed in a suitable boat and introduced into a high temperature sintering furnace. The sintering temperature depends upon the type of ceramic. For example, a temperature of 1400° C. is employed for 85% alumina. For 92–95% alumina, 1500° C. is employed. In excess of 95% alumina, a temperature of 1600° C. is employed. The latter temperature is also employed with sapphire. The sintering atmosphere can be hydrogen or dissociated ammonia which has been wetted by bubbling the incoming gas through a water bottle, which supplies just enough oxidizing atmosphere to establish a good bond between the metallizing and the ceramic. The sintering time that may be employed is about one-half hour at temperature. After removal from the furnace the metallized ceramic is then plated with either copper or nickel (flash) to enhance wetting by the brazing material during the brazing. In general, the plating thickness should not exceed 0.4 mil.

The metallic component of the seal is thoroughly cleaned before being sealed to the ceramic. This processing preferably includes degreasing and hydrogen or vacuum firing for outgassing. The two seal components are then ready for assembly for the final bonding. The components are placed in a suitable jig to provide necessary alignment, which may be made of stainless steel or graphite.

FIG. 1 shows the seal components when assembled in a jig prior to their final bonding. The metal member 1, for example of cold-rolled steel, is in the form of a rigid, thin cylinder or ring with a height of, say, one-eighth inch, and with a wall thickness of at least one-quarter inch for a one inch diameter seal. As the seal diameter decreases, smaller wall thicknesses of the metal member will still provide adequate rigidity. For transistor closure seals, even smaller wall thicknesses will be suitable. The wall thickness, however, must always be sufficiently large to maintain the ring rigid and incapable of distortion when it impresses its high compressional forces on the ceramic. The ceramic member, preferably an alumina-type, designated by reference number 2, has its outer surface metallized 3 as previously described and also includes the copper or nickel plating. In the preferred form of the invention, the inside hole of the metal ring 1 is tapered, and the outer surface of the ceramic ring 2 has a matching taper. The degree of taper in both members should be identical. It is preferred to use a taper of 3 to 5 degrees, though larger tapers may be used if desired. The smaller diameter of the tapered ceramic after metallization and plating should be at least the same size as the smaller inner diameter of the metal ring 1. Being at least the same size, the bottom surface of the ceramic will rest above that of the metal member as shown. The ceramic has a height which is less than that of the metal ring, since it is essential that the ceramic be confined entirely within the metal ring after the seal is completed. If the ceramic overhangs or extends beyond the plane of the metal member, the large compressional stresses established within the ceramic would cause failure of the seal due to shearing stresses.

Figure 2:
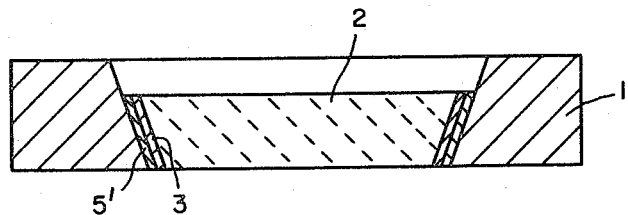
FIG. 2 is a cross-sectional view of the completed seal of FIG. 1.

A ring of hard solder or brazing metal 5 is then provided on top of the ceramic. It is preferred to employ for this purpose a high temperature brazing alloy such as copper, copper alloys, gold, gold alloys, or silver and silver alloys, since the higher the temperature the greater the thermal expansion differential and the higher the resultant compressional forces. As will be noted in FIG. 1, the brazing ring 5 seats in the cavity formed by the thinner ceramic member 2. The assembly arranged on a suitable support 6, is then placed within the brazing furnace wherein it is heated in a neutral or reducing atmosphere, for example, hydrogen, to the brazing temperature, for example 1,000° C. At this temperature, assuming the overall diameter of the ceramic disc to be about 1 inch, the metal will increase in size by about 14 to 20 mils. The ceramic, on the other hand, will expand only about 9 mils. This expansion difference will produce a gap or void between the ceramic and metal members which will instantly be filled by the liquid braze. In addition, the ceramic will probably drop slightly because of the taper to a lower position as shown in FIG. 2. The supporting surface 6 prevents it from extending below the metal member. The assembly need be kept in the brazing furnace only until the braze becomes liquid, after which it is removed from the hot zone and allowed to cool. The cooling may be done rapidly, since the resultant compressional stresses tend to strengthen the seal structure and prevent cracking due to thermal stresses. This is an additional feature encompassed by the use of this technique. During this cooling process, the braze 5' freezes first in place between the metal ring and ceramic disc and solidly bonds the metallized ceramic in position to the metal ring. As the cooling continues, since the gap formed by the expansion differential at the brazing temperature has now been reduced almost, if not completely, to zero both by the dropping of the ceramic and the presence of the interposed brazing material, a point is soon reached where the metal member cannot contract any further due to its inner surface being fixed by the intervening braze and ceramic, with the consequence that by the time room temperature is reached, tremendous inward radial forces are being exerted on the ceramic which places it in a highly compressive state. The outer metal member having a thick wall considerably stronger than the braze material, the contraction of the assembly is thus compelled to parallel the contraction curve of the metal. This places a tremendous amount of compressive stress on the ceramic and develops a true compressive seal. This seal differs from the ordinary glass compression seal, aside from the entirely different method of making, in that the ceramic is chemically bonded to the metal in addition to being tightly held in position by virtue of the compressive forces. The latter is however primarily responsible for the increased mechanical strength and thermal shock resistance of the completed seal.

Figure 3:
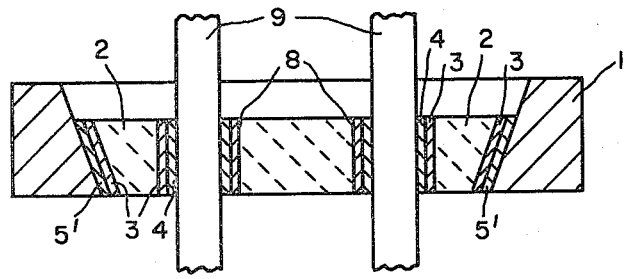
FIGS. 3 and 4 are cross-sectional views of modifications.

The compressional forces in the inventive seal as described also tend to facilitate the manufacture of solid pin or tubular seals within the ceramic member, since there is a transmittal of the compressional forces throughout the entire ceramic in a radial direction. FIG. 3 depicts a seal structure of this type. The ceramic insert 2 and the metal ring 1 correspond to the elements in FIGS. 1 and 2, except in this case a pair of holes 8 have been formed within the ceramic disc 2 and the whole surface of the holes has been metallized 3 similarly to the outer surface of the ceramic member 2. Pins 9 are hermetically sealed within the two holes. The pins 9 may be of iron, nickel, molybdenum or any other of the materials well known in this art, and are brazed to the metallized hole wall by the same or an equivalent brazing material 4 as used for bonding the ceramic member 2 to the surrounding metal ring 1. This is preferably carried out at the same time as the outer bond is formed. To this end, the pin diameter is chosen to be slightly smaller than the inside diameter of the metallized holes. The pins 9 are placed within the holes 8, they are held in position by the jig, and a small metal ring of brazing material is placed over each pin to seat at its junction with the ceramic. In the brazing furnace, the small brazing rings melt at the same time as the large brazing ring 5, flowing between each pin and the metallized wall of the holes, and during cooling solidly bonds each pin within its associated hole. This bond is strengthened, as previously explained, by the compressional forces established in the ceramic.

Figure 4:
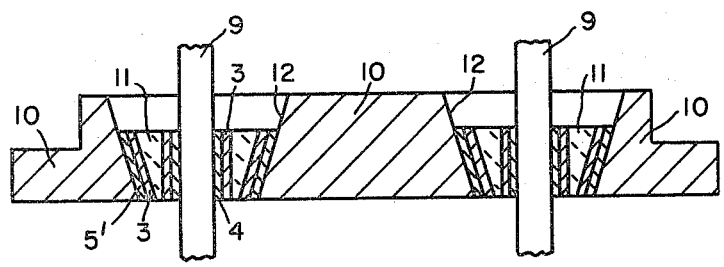

FIG. 4 shows a further modification in which two holes 12, or more if needed, are placed within a metal disc 10 and pins 9 are sealed with an intervening ceramic member 11 in a manner similar to that described in connection with FIG. 2 within each of these holes.

While I have described my invention in connection with specific embodiments and applications, other modifications thereof will be readily apparent to those skilled in this art without departing from the spirit and scope of the invention as defined in the appended claims.

What is claimed is:

1. A compression-type hermetic ceramic-metal seal, comprising an annular metal member having a relatively high thermal expansion coefficient, a ceramic member having a relatively low thermal expansion coefficient and lying wholly within the said metal member, a metallized surface on the ceramic member opposed to the metal member, and a layer of brazing material bonding the metal member to the metallized surface of the ceramic member, said metal member exerting compressive forces on the ceramic member.

2. A compression-type hermetic ceramic-metal seal, comprising a rigid annular metal member having a relatively high thermal expansion coefficient, a ceramic member having a relatively low thermal expansion coefficient and lying wholly within the said metal member, a metallized peripheral surface on the ceramic member opposed to the metal member, and a layer of brazing material bonding the inside surface of the metal member to the metallized surface of the ceramic member, said metal member exerting radial compressive forces on the ceramic member.

3. A seal as set forth in claim 2, wherein the expansion coefficients of the metal and ceramic members differ by at least a factor of 1.5.

4. A seal as set forth in claim 3, wherein the ceramic is a high alumina type.

5. A seal as set forth in claim 4, wherein the metallized surface is constituted of molybdenum-manganese.

6. A seal as set forth in claim 2, wherein a metal pin extends through and is hermetically sealed to the ceramic member.

7. A compression-type hermetic ceramic-metal seal, comprising an annular metal member having a relatively high thermal expansion coefficient and a tapered opening, a ceramic member having a relatively low thermal expansion coefficient and a taper substantially matching that of the metal member and lying wholly within the said metal member, a metallized surface on the ceramic member opposed to the metal member, and a layer of brazing material bonding the metal member to the metallized surface of the ceramic member, said metal member exerting compressive forces on the ceramic member.

8. A seal as set forth in claim 7, wherein the metal and ceramic members are circular, and the taper is between 3 to 5 degrees.

9. A seal as set forth in claim 7, wherein the ceramic member has a smaller height than that of the metal member.

10. A seal as set forth in claim 7, wherein the bottom surfaces of the metal and ceramic members are coplanar.

References Cited by the Examiner

UNITED STATES PATENTS

| 2,722,496 | 11/1955 | Hosmer | 29—473.1 |
| 2,728,425 | 12/1955 | Day | 287—189.365 |
| 2,798,577 | 7/1957 | LaForge | 287—189.365 |
| 2,917,140 | 12/1959 | Omley | 287—189.365 |
| 2,972,808 | 2/1961 | Litton | 29—473.1 |

RICHARD W. COOKE, JR., *Primary Examiner.*

JOHN F. CAMPBELL, *Examiner.*

JACOB L. NACKENOFF, L. R. RADANOVIC,
*Assistant Examiners.*